(12) United States Patent
Onggosanusi

(10) Patent No.: US 10,771,211 B2
(45) Date of Patent: Sep. 8, 2020

(54) METHOD AND APPARATUS FOR CHANNEL STATE INFORMATION (CSI) ACQUISITION WITH DL AND UL REFERENCE SIGNALS

(71) Applicant: Samsung Electronics Co., Ltd., Suwon-si (KR)

(72) Inventor: Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/888,766

(22) Filed: Feb. 5, 2018

(65) Prior Publication Data

US 2018/0287757 A1 Oct. 4, 2018

Related U.S. Application Data

(60) Provisional application No. 62/477,758, filed on Mar. 28, 2017, provisional application No. 62/580,275, (Continued)

(51) Int. Cl.
*H04B 7/06* (2006.01)
*H04L 5/00* (2006.01)
(Continued)

(52) U.S. Cl.
CPC ........... *H04L 5/0048* (2013.01); *H04L 5/005* (2013.01); *H04L 5/0051* (2013.01);
(Continued)

(58) Field of Classification Search
None
See application file for complete search history.

(56) References Cited

U.S. PATENT DOCUMENTS 9,426,755 B2    8/2016  Hoshino et al.
9,485,060 B2 *  11/2016  Nayeb Nazar ....... H04B 1/7097
(Continued)

FOREIGN PATENT DOCUMENTS

CN    103873124 A    6/2014
EP    2770785 A1    8/2014
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)," Technical Specification 3GPP TS 36.211 V12.4.0, Dec. 2014, 124 pages.
(Continued)

*Primary Examiner* — Sithu Ko

(57) ABSTRACT

Methods and apparatuses for channel state information (CSI) acquisition with downlink (DL) and uplink (UL) reference signals (RSs). A UE apparatus includes a transceiver and a processor operably connected to the transceiver. The transceiver is configured to receive (i) configuration information for a CSI-RS and a sounding reference signal (SRS) and (ii) downlink control information (DCI) that includes a DCI field for an aperiodic SRS transmission request. The processor is configured to decode the configuration information and the DCI with the aperiodic SRS transmission request. The transceiver is further configured to receive the CSI-RS and transmit the SRS. The SRS corresponds to a higher-layer configured SRS resource and a number of configured SRS resources is more than one.

11 Claims, 10 Drawing Sheets

Related U.S. Application Data filed on Nov. 1, 2017, provisional application No. 62/613,293, filed on Jan. 3, 2018, provisional application No. 62/624,496, filed on Jan. 31, 2018.

(51) Int. Cl.
*H04W 72/04* (2009.01)
*H04W 88/02* (2009.01)

(52) U.S. Cl.
CPC .......... *H04L 5/0053* (2013.01); *H04L 5/0092* (2013.01); *H04W 72/042* (2013.01); *H04W 88/02* (2013.01)

(56) References Cited

U.S. PATENT DOCUMENTS

| | | | |
|---|---|---|---|
| 9,917,676 B2* | 3/2018 | Ng | H04L 1/1812 |
| 2013/0322376 A1* | 12/2013 | Marinier | H04B 17/24 370/329 |
| 2014/0133418 A1* | 5/2014 | Takeda | H04L 5/0053 370/329 |
| 2014/0269451 A1* | 9/2014 | Papasakellariou | H04B 7/2656 370/280 |
| 2014/0269460 A1* | 9/2014 | Papasakellariou | H04L 5/1469 370/294 |
| 2015/0043465 A1 | 2/2015 | Ouchi | |
| 2015/0049626 A1* | 2/2015 | Chen | H04W 24/08 370/252 |
| 2015/0341149 A1 | 11/2015 | Chatterjee et al. | |
| 2016/0323828 A1* | 11/2016 | Takeda | H04J 11/00 |
| 2017/0141859 A1* | 5/2017 | Seo | H04B 17/24 |
| 2017/0311296 A1 | 10/2017 | Onggosanusi et al. | |
| 2018/0212800 A1 | 7/2018 | Park et al. | |
| 2018/0242285 A1 | 8/2018 | Yoo et al. | |
| 2019/0098523 A1* | 3/2019 | Muruganathan | H04L 5/0048 |

FOREIGN PATENT DOCUMENTS

| | | |
|---|---|---|
| WO | 2017/026762 A1 | 2/2017 |
| WO | 2017/026794 A1 | 2/2017 |
| WO | 2017188736 A2 | 11/2017 |

OTHER PUBLICATIONS

"3rd Generation Partnership Project; Technical Specification Group Radio Access Network; Evolved Universal Terrestrial Radio Access (E-UTRA); Multiplexing and channel coding (Release 12)," Technical Specification 3GPP TS 36.212 V12.3.0, Dec. 2014, 89 pages.

"3rd Generation Partnership Project; Technical Specification Group Radio Access Network; Evolved Universal Terrestrial Radio Access (E-UTRA); Physical layer procedures (Release 12)," Technical Specification 3GPP TS 36.213 V12.4.0, Dec. 2014, 225 pages.

"3rd Generation Partnership Project; Technical Specification Group Radio Access Network; Evolved Universal Terrestrial Radio Access (E-UTRA); Medium Access Control (MAC) protocol specification (Release 12)," Technical Specification 3GPP TS 36.321 V12.4.0, Dec. 2014, 60 pages.

"3rd Generation Partnership Project; Technical Specification Group Radio Access Network; Evolved Universal Terrestrial Radio Access (E-UTRA); Radio Resource Control (RRC); Protocol specification (Release 12)," Technical Specification 3GPP TS 36.331 V12.4.0, Dec. 2014, 410 pages.

"3rd Generation Partnership Project; Technical Specification Group Radio Access Network; NR; Physical channels and modulation (Release 15)," Technical Specification 3GPP TS 38.211 V15.0.0, Dec. 2017, 73 pages.

"3rd Generation Partnership Project; Technical Specification Group Radio Access Network; NR; Multiplexing and channel coding (Release 15)," Technical Specification 3GPP TS 38.212 V15.0.0, Dec. 2017, 82 pages.

"3rd Generation Partnership Project; Technical Specification Group Radio Access Network; NR; Physical layer procedures for control (Release 15)," Technical Specification 3GPP TS 38.213 V15.0.0, Dec. 2017, 56 pages.

"3rd Generation Partnership Project; Technical Specification Group Radio Access Network; NR; Physical layer procedures for data (Release 15)," Technical Specification 3GPP TS 38.214 V15.0.0, Dec. 2017, 71 pages.

"3rd Generation Partnership Project; Technical Specification Group Radio Access Network; NR; Medium Access Control (MAC) protocol specification (Release 15)," Technical Specification 3GPP TS 38.321 V15.0.0, Dec. 2017, 55 pages.

"3rd Generation Partnership Project; Technical Specification Group Radio Access Network; NR; Radio Resource Control (RRC); Protocol specification (Release 15)," Technical Specification 3GPP TS 38.331 V15.0.0, Dec. 2017, 188 pages.

"3rd Generation Partnership Project; Technical Specification Group Services and System Aspects; Feasibility Study on New Services and Markets Technology Enablers; Stage 1 (Release 14)," Technical Report 3GPP TR 22.891 V1.2.0, Nov. 2015, 96 pages.

International Search Report dated Jun. 26, 2018 in connection with International Patent Application No. PCT/KR2018/003442.

Extended European Search Report regarding Application No. 18774226.7, dated Mar. 4, 2020, 16 pages.

ZTE et al., "UL beam management", 3GPP TSG RAN WG1 Meeting #88bis, R1-1704399, Apr. 2017, 4 pages.

Huawei et al., "DL beam management with reduced overhead", 3GPP TSG RAN WG1 Meeting #88, R1-1701720, Feb. 2017, 3 pages.

Huawei et al., "DL CSI-RS design for NR CSI acquisition", 3GPP TSG RAN WG1 Meeting #87, R1-1611241, Nov. 2016, 7 pages.

Ericsson, "On CSI for multi-antenna operation in NR", TSG-RAN WG1 #85, R1-164952, May 2016, 5 pages.

\* cited by examiner

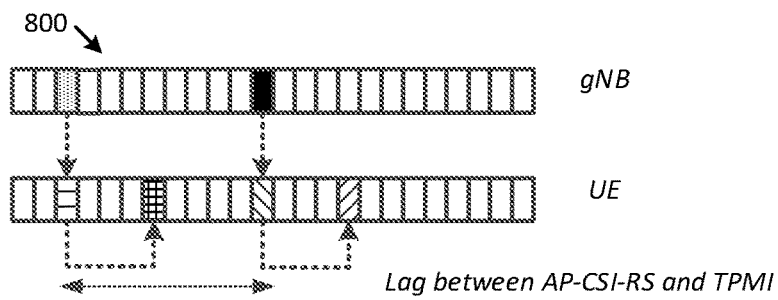

Lag between AP-CSI-RS and TPMI

▨ gNB triggers AP-SRS from UE-k via DCI and transmits AP-CSI-RS in a same slot/subframe ⌣ 810

▤ UE-k receives DCI, measures AP-CSI-RS ⌣ 820

▦ UE-k reports A-CSI and transmits AP-SRS on slot/subframe $n+L$ ⌣ 830

■ gNB sends an UL grant to UE-k (including TPMI and TRI) ⌣ 840

▧ UE-k receives UL grant (including TPMI and TRI) ⌣ 850

▨ UE-k transmits data (granted transmission) on PUSCH ⌣ 860

FIG. 8

METHOD AND APPARATUS FOR CHANNEL STATE INFORMATION (CSI) ACQUISITION WITH DL AND UL REFERENCE SIGNALS

CROSS-REFERENCE TO RELATED APPLICATIONS AND CLAIM OF PRIORITY

This application claims the benefit of U.S. Provisional Patent Application Ser. No. 62/477,758 filed Mar. 28, 2017; U.S. Provisional Patent Application Ser. No. 62/580,275 filed Nov. 1, 2017; U.S. Provisional Patent Application Ser. No. 62/613,293 filed Jan. 3, 2018; and U.S. Provisional Patent Application Ser. No. 62/624,496 filed Jan. 31, 2018. The above-identified provisional patent applications are hereby incorporated by reference in their entirety.

TECHNICAL FIELD

The present disclosure relates generally to methods for enabling concurrent use of downlink (DL) and uplink (UL) reference signals (RSs) and more particularly to CSI acquisition with DL and UL signals.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for concurrent use of DL and UL RSs.

In one embodiment, a UE is provided. The UE includes a transceiver and a processor operably connected to the transceiver. The transceiver is configured to receive (i) configuration information for a CSI-RS and a sounding reference signal (SRS) and (ii) downlink control information (DCI) that includes a DCI field for an aperiodic SRS transmission request. The processor is configured to decode the configuration information and the DCI with the aperiodic SRS transmission request. The transceiver is further configured to receive the CSI-RS and transmit the SRS. The SRS corresponds to a higher-layer configured SRS resource and a number of configured SRS resources is more than one.

In another embodiment, a base station (BS) is provided. The BS includes a processor and a transceiver operably connected to the processor. The processor is configured to generate (i) configuration information for a CSI-RS and a SRS and (ii) DCI that includes a DCI field for requesting transmission of an aperiodic SRS. The transceiver is configured to transmit, to a UE, the configuration information and the DCI via a DL channel and the CSI-RS and receive, from the UE, the requested aperiodic SRS. The SRS corresponds to a higher-layer configured SRS resource and a number of configured SRS resources is more than one.

In yet another embodiment, a method for operating a UE is provided. The method includes receiving and decoding (i) configuration information for a channel state information reference signal (CSI-RS) and a sounding reference signal (SRS) and (ii) downlink control information (DCI) that includes a DCI field for requesting an aperiodic SRS transmission. The method also includes receiving the CSI-RS and transmitting the SRS. The SRS corresponds to a higher-layer configured SRS resource and a number of configured SRS resources is more than one.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example embodiment of AP-SRS triggering according to an embodiment of the present disclosure;

DETAILED DESCRIPTION

Figure 1:
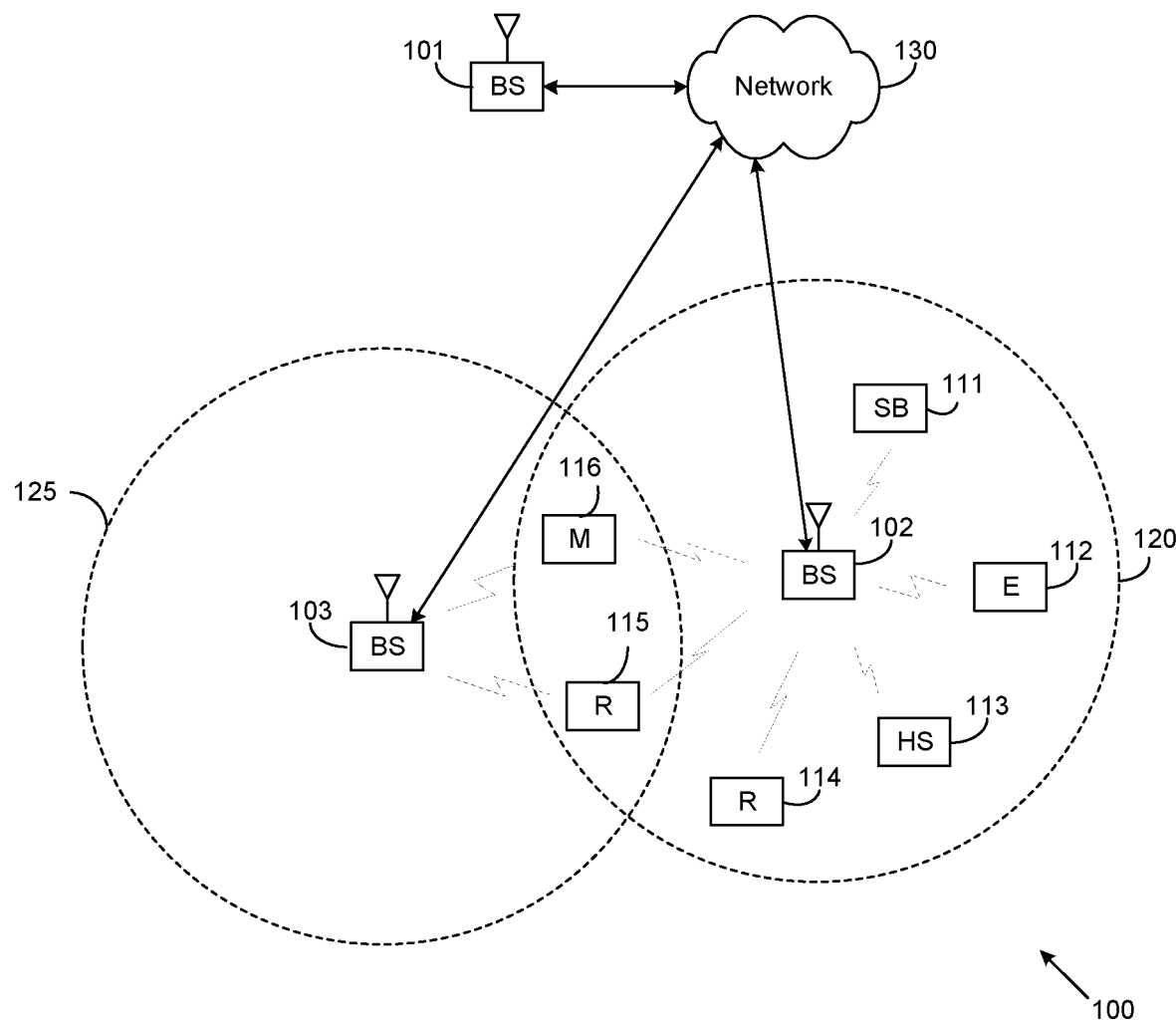
FIG. 1 illustrates an example wireless network according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

List Of Acronyms
2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 15.0.0, "NR, Physical channels and modulation" ("REF 6"); 3GPP TS 38.212 version 15.0.0, "NR, Multiplexing and Channel coding" ("REF 7"); 3GPP TS 38.213 version 15.0.0, "NR, Physical Layer Procedures for Control" ("REF 8"); 3GPP TS 38.214 version 15.0.0, "NR, Physical Layer Procedures for Data" ("REF 9"); 3GPP TS 38.321 version 15.0.0, "NR, Medium Access Control (MAC) Protocol Specification" ("REF 10"); and 3GPP TS 38.331 version 15.0.0, "NR, Radio Resource Control (RRC) Protocol Specification" ("REF 11").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit measurement reference signals to UEs 111-116 and configure UEs 111-116 for CSI reporting as described in embodiments of the present disclosure. In various embodiments, one or more of UEs 111-116 receive Channel State Information Reference Signal (CSI-RS) and transmit Sounding Reference Signal (SRS).

Although FIG. 1 illustrates one example of a wireless network 100, various changes can be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
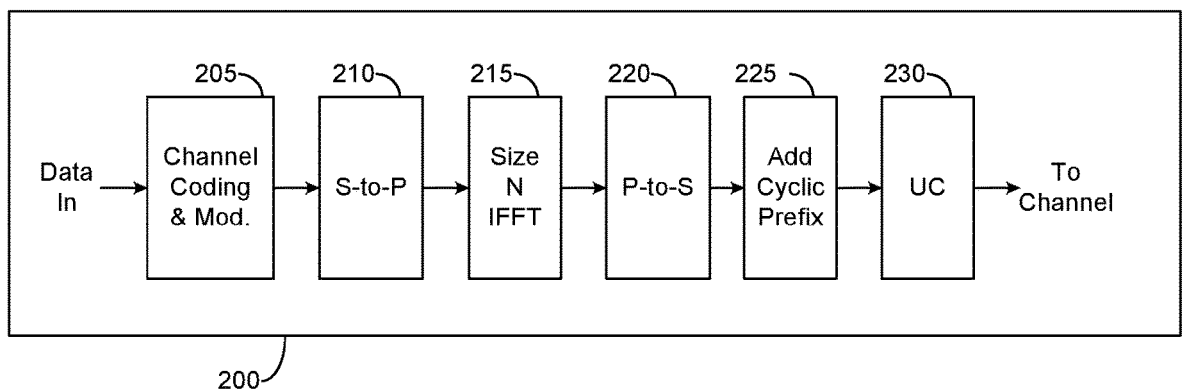
FIGS. 2A and 2B illustrate example wireless transmit and receive paths according to various embodiments of the present disclosure.
Figure 2B:
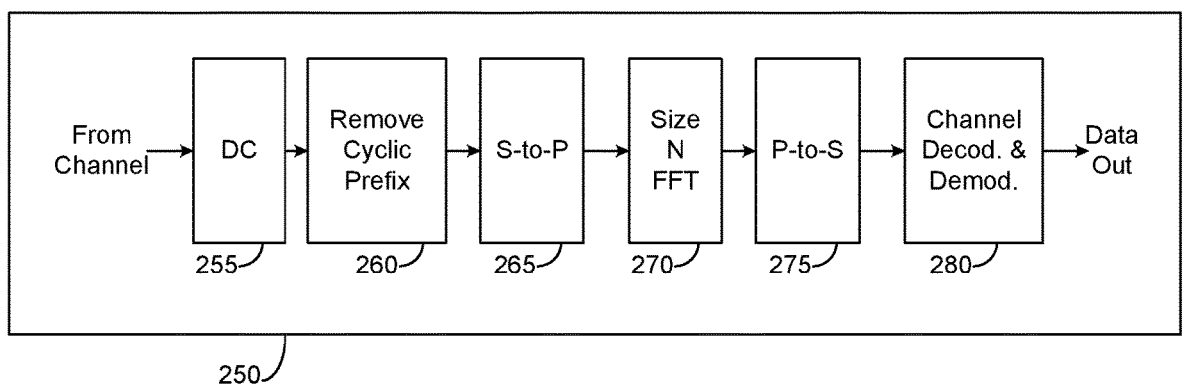

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 could be implemented in a gNB and that the transmit path 200 could be implemented in a UE. In some embodiments, the receive path 250 is configured to receive CSI-RS and transmit SRS as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
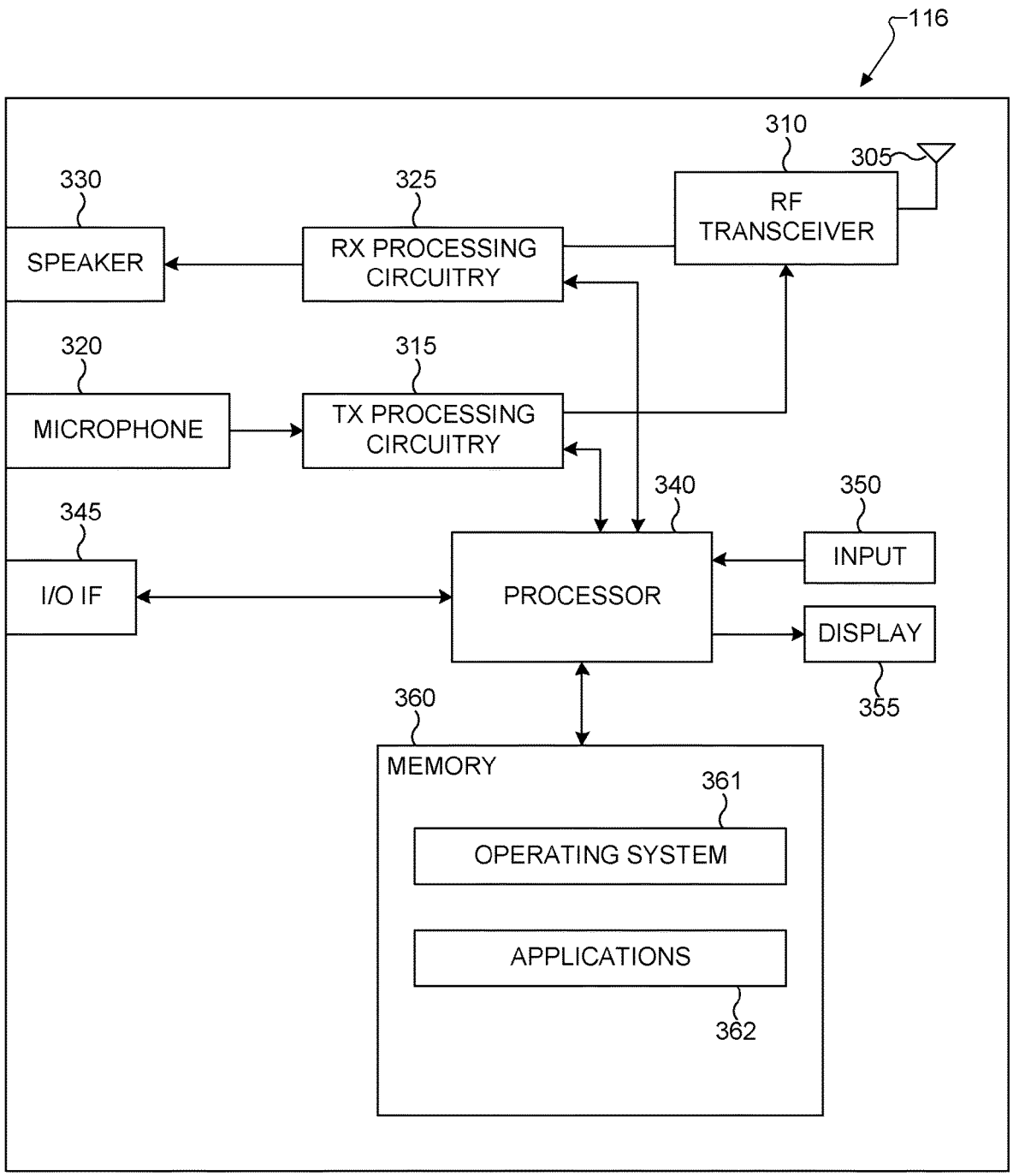
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CSI-RS reception and measurement for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
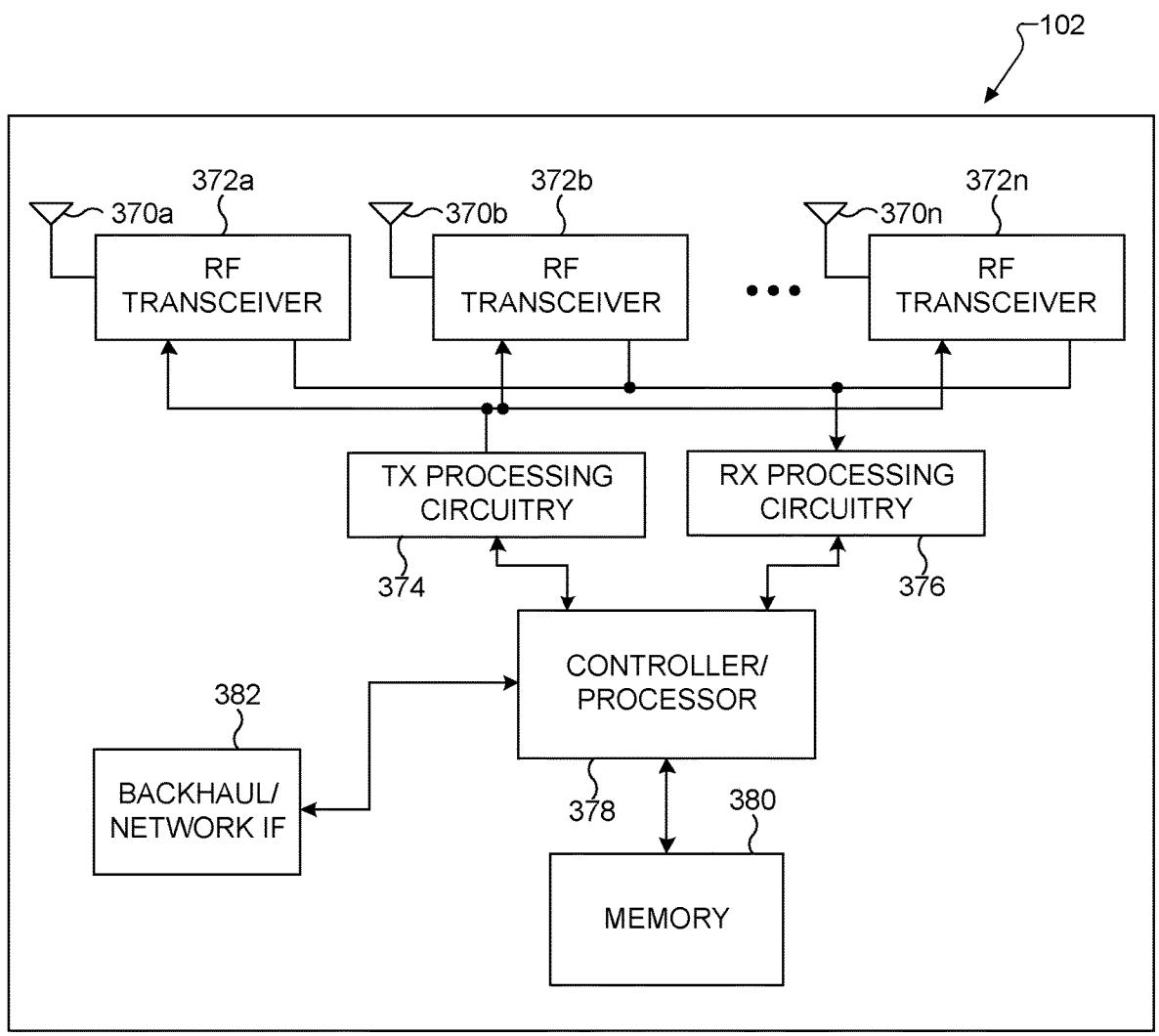
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 could support communications over any suitable wired or wireless connection(s). For example, when the gNB 102 is implemented as part of a cellular communication system (such as one supporting 5G or new radio access technology or NR, LTE, or LTE-A), the backhaul or network interface 382 could allow the gNB 102 to communicate with other gNBs over a wired or wireless backhaul connection. When the gNB 102 is implemented as an access point, the backhaul or network interface 382 could allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) allocate and transmit CSI-RS as well as allocate and receive SRS.

Although FIG. 3B illustrates one example of a gNB 102, various changes can be made to FIG. 3B. For example, the gNB 102 could include any number of each component shown in FIG. 3A. As a particular example, an access point could include a number of backhaul or network interfaces 382, and the controller/processor 378 could support routing functions to route data between different network addresses. As another particular example, while shown as including a single instance of TX processing circuitry 374 and a single instance of RX processing circuitry 376, the gNB 102 could include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 4:
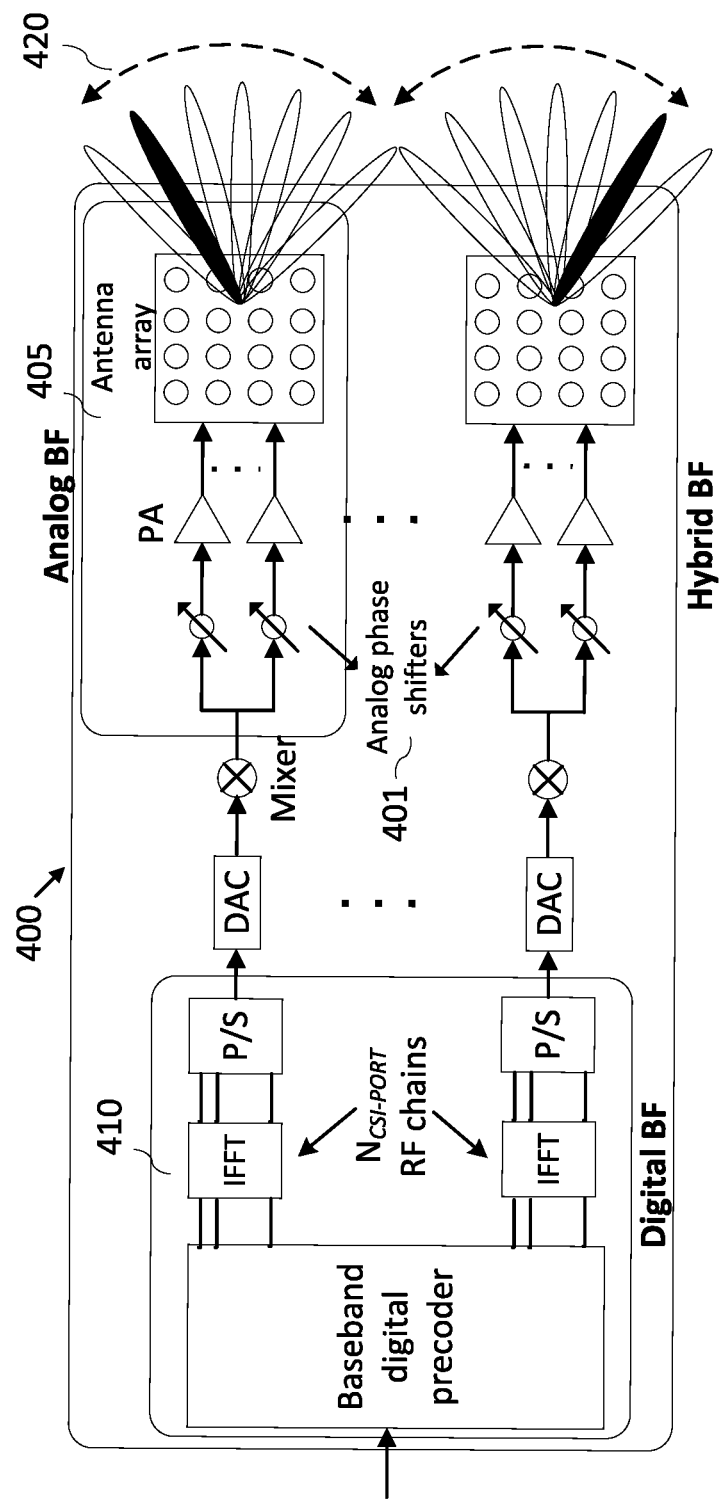
FIG. 4 illustrates an example beamforming architecture wherein one CSI-RS port is mapped onto a large number of analog-controlled antenna elements.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in embodiment 400 of FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks.

A UE is configured with CSI-RS for DL CSI measurement and reporting. An allocation unit for CSI-RS can be termed CSI-RS resource which can correspond to non-zero-power (NZP) or zero-power (ZP). NZP CSI-RS is mainly used for channel measurement while ZP CSI-RS for interference measurement. For 5G NR, NZP CSI-RS resource is defined as a set of NZP CSI-RS port(s) mapped to a set of REs within a frequency span/a time duration which can be measured at least to derive a CSI. Multiple NZP CSI-RS resources can be configured to UE for supporting CoMP, beam management, and multiple beamformed CSI-RS based operations, where each NZP CSI-RS resource can have different number of CSI-RS ports. Upon measuring the allocated CSI-RS, the UE calculates and reports DL CSI to the gNB/network. The gNB/network utilizes the reported DL CSI for DL link adaptation and scheduling.

Likewise, a UE is configured with SRS for UL CSI measurement. An allocation unit for SRS can be termed SRS resource which, just as CSI-RS, can correspond to non-zero-power (NZP) or zero-power (ZP). NZP SRS is mainly used for channel measurement while ZP SRS for interference measurement. For 5G NR, SRS resource is defined as a set of SRS port(s) mapped to a set of REs within a frequency span/a time duration which can be measured at least to derive a CSI. Multiple SRS resources can be configured to UE for supporting beam management and multiple beamformed SRS based operations, where each SRS resource can have different number of SRS ports. Upon measuring the SRS transmitted by the UE, the gNB/network calculates UL CSI and utilizes it for DL link adaptation and scheduling.

In some deployment scenarios such as TDD, half-duplex, or FDD with small DL-UL duplex distance, DL-UL channel reciprocity (partial or full) is feasible. In particular, when full DL-UL channel reciprocity is available, it can be used to improve CSI acquisition—both for DL and UL. Here, concurrent utilization of CSI-RS and SRS is beneficial. Furthermore, joint CSI-RS/SRS operation (including configuration as well as CSI measurement, calculation, and/or reporting procedures) facilitates more efficient utilization and improvement in CSI accuracy.

Therefore, there is another need for designing procedures which enable improvement in joint utilization between CSI-RS and SRS for DL/UL CSI acquisition.

TABLE 1 outlines four scenarios where a UE is configured with CSI-RS and SRS. Case I and II is a typical scenario for DL and UL CSI acquisition, respectively. For Case I, only CSI-RS is used whereas for Case II, only SRS is used. Case III can be used when DL-UL channel reciprocity is available and the UE is configured with SRS so that the gNB can measure the SRS for improving UL CSI. Here, SRS alone is in general insufficient since DL and UL interference profiles are typically not reciprocal even for where DL-UL channel reciprocity holds. Therefore, joint utilization of CSI-RS and SRS is needed. For example, CSI reports from the UE can be used together with the measured channel via SRS. Case IV can be used when DL-UL channel reciprocity is available and the UE is configured with CSI-RS so that the UE can measure the CSI-RS for improving UL CSI acquisition. Similarly, CSI-RS alone is in general insufficient since DL and UL interference profiles are typically not reciprocal even for where DL-UL channel reciprocity holds. Therefore, joint utilization of CSI-RS and SRS is needed. For example, the precoding information from the associated UL-related DCI (transmit PMI and RI) can be used together with the measured channel via CSI-RS to improve UL precoding.

TABLE 1

|  | DL CSI acquisition | UL CSI acquisition |
| --- | --- | --- |
| UE is configured with CSI-RS | (I) UE can measure DL channel for CSI/BM reporting | (IV) UE can measure UL channel for UL precoder calculation |
| UE is configured with SRS | (III) gNB can measure DL channel for DL link adaptation (including DL precoder calculation) | (II) gNB can measure UL channel for UL link adaptation |

For Case III and IV, although implementation-based schemes can be used, some restrictions and procedures for jointly configuring CSI-RS and SRS can be beneficial.

The present disclosure includes the following components. A first component of this invention pertains to SRS-assisted DL CSI acquisition (cf. Case III). A second component pertains to CSI-RS-assisted UL CSI acquisition (cf. Case IV). Each of these components can be used either by itself (without the other component) or in conjunction with at least one of the other component. Likewise, each of these components includes a plurality of sub-components. Each of the sub-components can be used either by itself (without any other sub-component) or in conjunction with at least one of the other sub-components.

Three time-domain behaviors of CSI-RS as well as SRS are considered: periodic (P), semi-persistent (SP), and aperiodic (AP).

For description of embodiments, the NR CSI framework is used throughout the present disclosure. A UE can be configured with N≥1 CSI Reporting Settings, M≥1 Resource Settings, and a Measurement Setting wherein the Measurement Setting includes L≥1 links. Each link associates a CSI Reporting Setting and a Resource Setting, as well as configures other features such as measurement quantity (either channel or interference). Channel/interference measurement restriction can be included in either a link, or a CSI Reporting Setting, or a Resource Setting. A CSI Reporting Setting can be linked with one or more Resource Settings. Likewise, a Resource Setting can be linked with one or more CSI Reporting Settings.

All or at least one of the following components and embodiments are applicable for transmission with CP-OFDM (cyclic prefix OFDM) waveform as well as DFT-SOFDM (DFT-spread OFDM) and SC-FDMA (single-carrier FDMA) waveforms. Furthermore, all or at least one of the following components and embodiments are applicable for transmission when the scheduling unit in time is either one subframe (which can include one or multiple slots) or one slot.

For the first component (that is, SRS-assisted DL CSI acquisition), CSI-RS can be used for DL channel and DL interference measurements at the UE wherein the UE measures channel and interference via CSI-RS (either NZP, or ZP, or both), calculates CSI, and reports CSI to the gNB/network. The same holds for beam management (BM) wherein the UE calculates and reports beam reporting (such as RSRP and other beam-related information). Therefore, DL CSI is acquired by gNB via CSI/BM reporting. When DL-UL channel reciprocity is feasible, SRS can be used to enhance DL channel measurement (such as to provide higher channel measurement resolution). Here, the UE is configured to transmit SRS which is measured by the gNB/network. Due to channel reciprocity, the measured UL channel via SRS can offer a good approximation of the associated DL channel. Therefore, a UE can be configured with CSI-RS and SRS for the purpose of DL channel acquisition.

The following embodiments include some procedures which can be used to configure a UE with both CSI-RS and SRS for the purpose of DL channel acquisition. Each embodiment includes at least a linkage between CSI-RS and SRS which a UE can assume for DL channel/interference measurement, CSI-RS/SRS timing relationship, and DL CSI calculation.

In one embodiment (I.A), a CSI Reporting Setting is linked with at least 2 Resource Settings: one for CSI-RS, and one for SRS. For these two Resource Settings, the number of SRS ports can be set equal to the number of UE RX ports. At least some of the following sub-embodiments can be used where multiple Resource Settings are linked with one CSI Reporting Setting.

In a first sub-embodiment (Scheme 1), the first Resource Setting is configured for NZP CSI-RS and used for both DL channel and DL interference measurements. The second Resource Setting is configured for (NZP) SRS and used for DL channel measurement (via gNB/network measurement of UL channel). In a second sub-embodiment (Scheme 2), the first Resource Setting is configured for NZP CSI-RS and used for DL interference measurement. The second Resource Setting is configured for (NZP) SRS and used for DL channel measurement (via gNB/network measurement of UL channel). In a third sub-embodiment (Scheme 3), the first Resource Setting is configured for ZP CSI-RS and used for DL interference measurement. The second Resource Setting is configured for (NZP) SRS and used for DL channel measurement (via gNB/network measurement of UL channel). In a fourth sub-embodiment (Scheme 4), at least 3 Resource Settings can be used. The first Resource Setting is configured for NZP CSI-RS and used for DL channel measurement. The second Resource Setting is configured for (NZP) SRS and used for DL channel measurement (via gNB/network measurement of UL channel). The third Resource Setting is configured for either ZP CSI-RS, or NZP CSI-RS, or DL DMRS, for DL interference measurement.

For Scheme 1 and Scheme 4, two Resource Settings (hence 2 types of resources: CSI-RS and SRS) are used for DL channel measurement. This can imply that the UE can measure the first Resource Setting (with NZP CSI-RS) and calculate CSI reporting (with another resource for DL interference measurement for Scheme 4) based on this. At the same time, the UE transmits SRS to aid the gNB/network in DL CSI acquisition (wherein the gNB/network can use CSI reports in conjunction with its measurement of SRS for the purpose of link adaptation and scheduling).

For the above sub-embodiments of this embodiment, in the Resource Setting which includes SRS resource configuration (which can include one or more SRS resources), a parameter (termed 'Function' in the present disclosure for illustrative purposes) which indicates its use for DL CSI acquisition (in contrast to UL CSI acquisition) can be used. This parameter can take two values such as 'DL CSI' or 'UL CSI'. When SRS is configured as such (for DL CSI acquisition), TX (transmit) precoding applied to SRS (by the UE) should be the same as (or at least match) the RX (receive) precoding applied to UE RX ports (for the purpose of receiving DL transmissions). Here, some type of QCL/correspondence between this SRS (in one Resource Setting) and a configured CSI-RS (in another Resource Setting) can be used. This correspondence between CSI-RS and SRS can be a part of or in addition to the parameter 'Function' or can be configured separately. Note that if the configured CSI-RS includes K>1 resources, the number of SRS resources can also include K>1 resources wherein each of the K CSI-RS resources corresponds to one of the K SRS resources. In this case, the correspondence includes K links. Optionally, the number of SRS resources K'≥1 is not necessarily equal to K. In this case, correspondence between K'≥1 SRS resources and K>1 CSI-RS resources can also be configured. This configured correspondence can be used, for instance, for aperiodic CSI-RS and aperiodic SRS. This correspondence can facilitate joint triggering (performed dynamically via L1 DL control channel) of CSI-RS and SRS. In this case, this correspondence can be a mapping between the code points of the DCI field for the joint triggering and the SRS resource index (each of which corresponding to a CSI-RS resource index). This correspondence information can be signaled either via higher-layer (e.g. RRC) signaling or MAC CE (control element).

In terms of SRS resource configuration, at least the following mechanisms related to time-domain behavior are pertinent.

In a first mechanism, when P/SP-CSI-RS and P/SP-SRS are configured as such (four possible combinations: P-CSI-RS+P-SRS, P-CSI-RS+SP-SRS, SP-CSI-RS+P-SRS, and SP-CSI-RS+SP-SRS), the relationship between subframeConfiguration or slotConfiguration (which includes slot/subframe offset and periodicity) of these CSI-RS and SRS can be utilized. For example, the SRS periodicity can be set equal to an integer multiple of CSI-RS periodicity while SRS slot/subframe offset can be defined relative to CSI-RS slot/subframe offset.

When SP-CSI-RS and SP-SRS are configured, SP-SRS can share the same activation/deactivation as SP-CSI-RS. Sharing the same activation/deactivation refers to the use of one resource activation/deactivation message to activate or deactivate both SP-CSI-RS and SP-SRS. This message can be signaled to the UE via MAC CE (control element) or L1 DL control signaling (using either DL-related or UL-related DCI). When an activation message is received by the UE in slot/subframe n, the UE can assume that starting from slot/subframe n+D1 (where D1 can either be specified, or configured via higher-layer signaling, or signaled via L1 DL control signaling), the UE can measure CSI-RS with the configuration information (including resource index/indices, periodicity and slot/subframe offset) given in the Resource Setting with CSI-RS as well as transmit SRS with the configuration information (including resource index/indices, periodicity, and slot/subframe offset) given in the Resource Setting with SRS Likewise, when a deactivation message is received by the UE in slot/subframe n, the UE can assume that starting from slot/subframe n+D2 (where D2 can either be specified, or configured via higher-layer signaling, or signaled via L1 DL control signaling), the UE can stop measuring CSI-RS with the configuration information (including resource index/indices, periodicity and slot/subframe offset) given in the Resource Setting with CSI-RS as well as stop transmitting SRS with the configuration information (including resource index/indices, periodicity, and slot/subframe offset) given in the Resource Setting with SRS. Since CSI-RS and SRS resource configurations are in general not the same, the activation/deactivation message can include two resource configuration fields—one for CSI-RS, the other for SRS.

If K>1 resources are configured for CSI-RS, the configuration field in the activation/deactivation message can also include N-subset selection of K resources (1≤N≤K). Likewise, if K'>1 resources are configured for SRS, the configuration field in the activation/deactivation message can also include N'-subset selection of K' resources (1≤N'≤K'). The values of N and N' can be configured via higher-layer signaling or via MAC CE (either explicitly or implicitly inferred from an activation message).

The embodiment in the previous paragraph can also apply to S>1 CSI-RS resource sets instead of K>1 CSI-RS resources. Or it can also apply to S'>1 SRS resource groups instead of K'>1 SRS resources.

This mechanism can be extended when the UE is configured with another CSI-RS (either NZP or ZP, such as Scheme 4)—via another Resource Setting—for DL interference measurement. In this case, the activation/release message also includes configuration information pertaining to the other CSI-RS.

Figure 5:
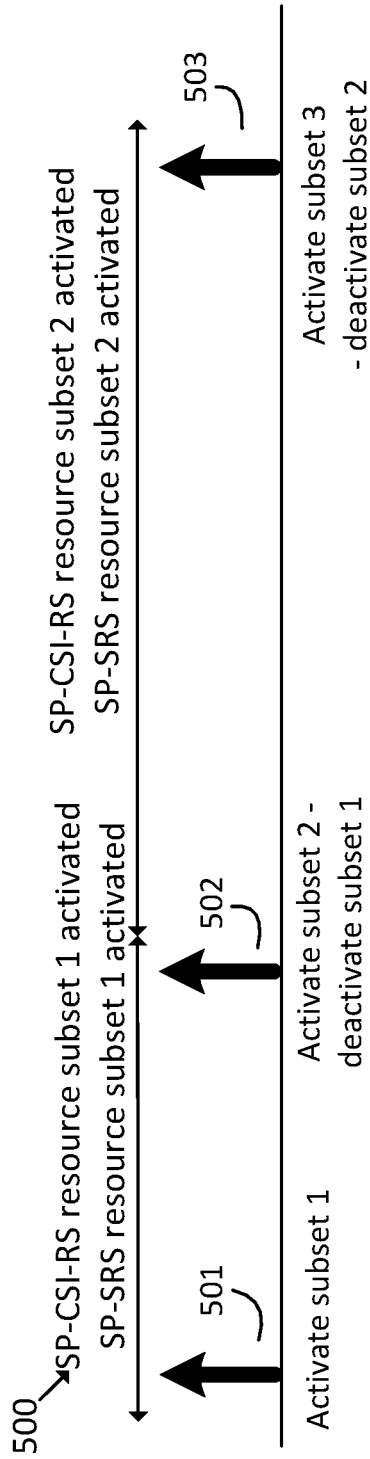
FIG. 5 illustrates an example embodiment of the joint activation/deactivation mechanism when a UE is configured with both semi-persistent (SP) CSI-RS and SP-SRS according to an embodiment of the present disclosure.

Diagram 500 of FIG. 5 illustrates the joint activation/deactivation mechanism when a UE is configured with both SP-CSI-RS with K>1 resources and SP-SRS with K'>1 resources. When a UE receives an activation message 501 indicating SP-CSI-RS resource subset 1 and SP-SRS resource subset 1, after a certain delay (either specified or configured), the UE assumes that SP-CSI is calculated based on SP-CSI-RS associated with SP-CSI-RS resource subset 1 and SP-SRS associated with SP-SRS resource subset 1 is transmitted in the same slot/subframe as the SP-CSI reporting. These subsets are then replaced by SP-CSI-RS subset 2 and SP-SRS subset 2 when the UE receives another activation message 502. In turn, these subsets are then replaced by SP-CSI-RS subset 3 and SP-SRS subset 3 when the UE receives another activation message 503.

In a second mechanism, when AP-CSI-RS and AP-SRS are configured as such, the same DCI is used to trigger A-CSI reporting as well as AP-SRS transmission with the presence of AP-CSI-RS in the same slot/subframe. Therefore, when the UE receives either an UL-related or DL-related DCI which includes CSI request field and the CSI request field in ON (implying a request for A-CSI reporting) in slot/subframe n, the UE will report A-CSI and transmit AP-SRS in slot/subframe n+D3 (where D3 can either be specified, or configured via higher-layer signaling, or signaled via L1 DL control signaling). Therefore, the gNB/network receives both A-CSI reporting and AP-SRS transmission in the same slot/subframe.

When both AP-CSI-RS and AP-SRS are configured with multiple resources (K>1 resources are configured for CSI-RS and K'>1 resources are configured for SRS), AP-SRS can share the same activation as AP-CSI-RS. Sharing the same activation refers to the use of one resource activation message to perform both N-subset selection of K resources (1≤N≤K) for AP-CSI-RS and N'-subset selection of K' resources (1≤N'≤K') for AP-SRS. This message can be signaled to the UE via MAC CE (control element) or L1 DL control signaling (using either DL-related or UL-related DCI). When an activation message is received by the UE in slot/subframe n, the UE can assume that starting from slot/subframe n+D4 (where D1 can either be specified, or configured via higher-layer (e.g. RRC) signaling, or signaled via L1 DL control signaling), the N-subset of AP-CSI-RS resources and the N'-subset selection of AP-SRS resources indicated in the resource selection information (in the activation message) are selected. Since CSI-RS and SRS resource configurations are in general not the same, the activation/deactivation message can include two resource configuration fields—one for CSI-RS, the other for SRS.

The embodiment in the previous paragraph can also apply to S>1 CSI-RS resource sets instead of K>1 CSI-RS resources. Or it can also apply to S'>1 SRS resource groups instead of K'>1 SRS resources.

Figure 6:
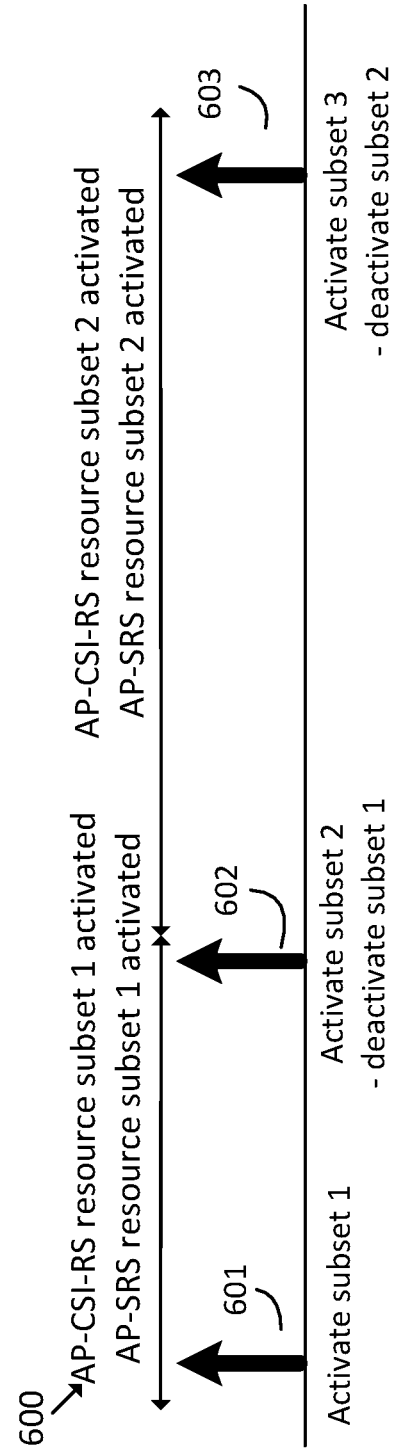
FIG. 6 illustrates an example embodiment of the joint activation/deactivation mechanism when a UE is configured with both aperiodic (AP) CSI-RS and AP-SRS according to an embodiment of the present disclosure.

Diagram 600 of FIG. 6 illustrates the joint activation/deactivation mechanism when a UE is configured with both AP-CSI-RS with K>1 resources and AP-SRS with K'>1 resources. When a UE receives an activation message 601 indicating AP-CSI-RS resource subset 1 and AP-SRS resource subset 1, after a certain delay (either specified or configured), the UE assumes that AP-CSI-RS resource subset 1 and AP-SRS resource subset 1 are selected. These subsets are then replaced by AP-CSI-RS subset 2 and AP-SRS subset 2 when the UE receives another activation message 602. In turn, these subsets are then replaced by AP-CSI-RS subset 3 and AP-SRS subset 3 when the UE receives another activation message 603.

The values of N and N' can be configured via higher-layer signaling or via MAC CE (either explicitly or implicitly inferred from an activation message). If N>1 and/or N'>1, the CSI request field can either be expanded or accompanied with some additional information for selecting 1 out of N AP-CSI-RS resources and/or 1 out of N' AP-SRS resources. This selection can be performed either using the same DCI which includes CSI request field, or using another mechanism (such as via MAC CE especially when a UE is configured with multiple component carriers).

Figure 7:
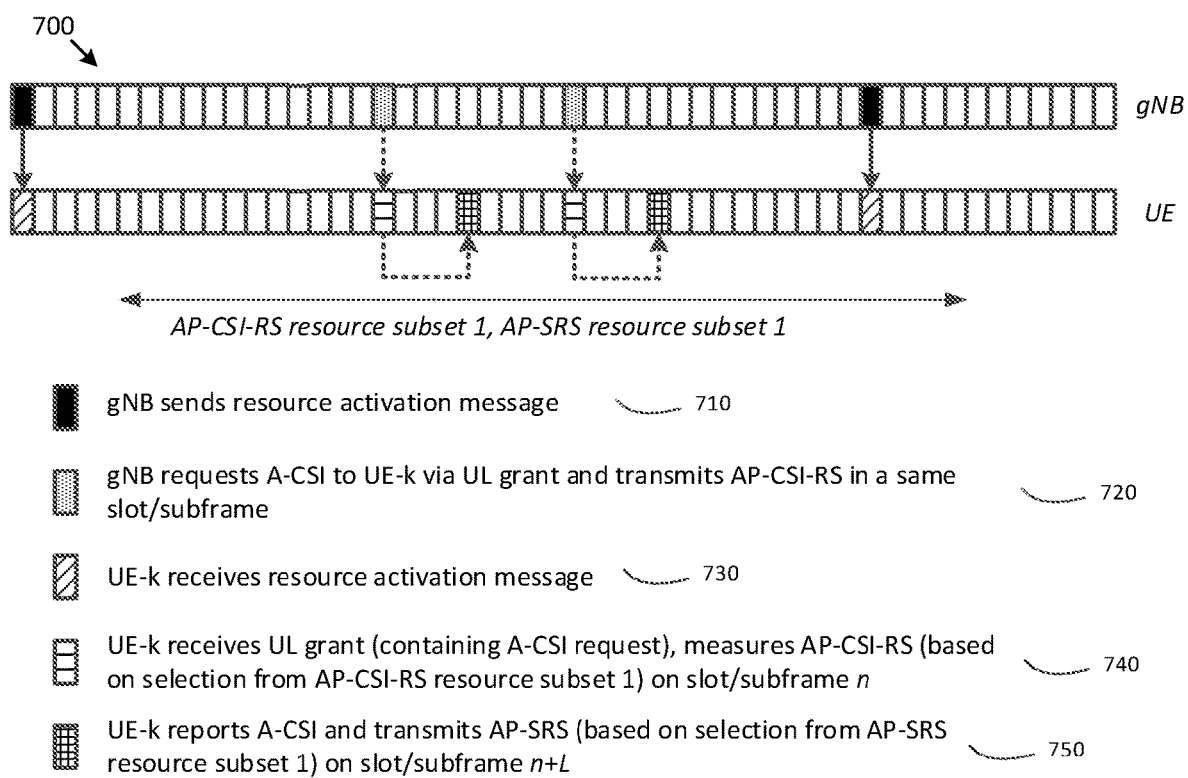
FIG. 7 illustrates an example embodiment of a DCI-based joint activation/deactivation mechanism when a UE is configured with both AP-CSI-RS and AP-SRS according to an embodiment of the present disclosure.

Diagram 700 of FIG. 7 illustrates an example usage of joint resource activation and A-CSI reporting mechanism when a UE is configured with both AP-CSI-RS and AP-SRS wherein the gNB sends a resource activation message as described in the above mechanism 2 (710). This message is received by the UE (730) and successfully decoded. As this message indicates the selection of AP-CSI-RS resource subset 1 and AP-SRS resource subset 1, the UE assumes (after a certain delay, specified or configured) that the received AP-CSI-RS and the transmitted AP-SRS will be based on the resource subsets indicated by the joint activation message. When the gNB request A-CSI reporting from the UE via an UL-related DCI (720), it transmits the AP-CSI-RS based on a selection from AP-CSI-RS resource subset 1 (further selection from the N resources can be either pre-configured, or dynamically signaled via a separate mechanism, or dynamically signaled using the same DCI). When the UE receives this UL-related DCI, it measures the transmitted AP-CSI-RS (740). The UE then reports the calculated A-CSI and transmits AP-SRS in the same slot/subframe based on AP-SRS resource subset 1 indicated in the activation message (750).

For the second component (that is CSI-RS-assisted UL CSI acquisition), SRS can be used for UL channel and UL interference measurements at the gNB/network wherein the gNB/network measures channel and interference via SRS (either NZP, or ZP, or both), calculates UL CSI, and utilizes it for link adaptation and scheduling. Therefore, UL CSI is acquired by gNB via measuring SRS. From this UL CSI acquisition, the UE is assigned an UL grant via an UL-related DCI which contains UL transmission parameters such as MCS, transmit PMI, and/or transmit RI. When DL-UL channel reciprocity is feasible, CSI-RS can be used to enhance UL channel measurement (such as to provide higher UL channel measurement resolution at the UE). Here, the UE is configured to receive CSI-RS which is measured by the UE. Due to channel reciprocity, the measured DL channel via CSI-RS can offer a good approximation of the associated UL channel. This can improve, for instance, UE UL precoding beyond the resolution given by TPMI (while UE still follows TRI signaled by gNB). Therefore, a UE can be configured with CSI-RS and SRS for the purpose of UL channel acquisition.

The following embodiments include some procedures which can be used to configure a UE with both CSI-RS and SRS for the purpose of UL channel acquisition. Each embodiment includes at least a linkage between CSI-RS and SRS which a UE can assume for UL channel/interference measurement, CSI-RS/SRS timing relationship, and UL CSI calculation. The following embodiments can be operational in conjunction with some other UE-specific settings. For example, when a UE is configured for a particular UL transmission scheme or mode (for instance, non-codebook-based UL transmission or no-PMI/TPMI UL-related DCI), a UE can also be configured for measuring CSI-RS for the purpose of UL CSI acquisition (or in general, UL transmission). Along this line, several configuration possibilities exist for configuring the UE to operate as such: 1) UL transmission scheme is set to operate without PMI or TPMI, and CSI-RS reception/measurement is ON; 2) UL transmission scheme is set to operate without PMI or TPMI; 3) CSI-RS reception/measurement is ON regardless of the presence of UL transmission scheme configuration; 4) A set of CSI-RS resources or one CSI-RS resource is configured for the UE and linked (with a correspondence configured, for instance, via higher-layer signaling) with one or more configured SRS resources. Such configuration can be performed either via higher-layer signaling (L2 or L3) or L1 DL control channel (hence the possibility of dynamic switching).

In one embodiment (II.A), the number of configured CSI-RS ports can be set equal to the number of gNB RX (receive) ports. Optionally, within CSI-RS resource configuration, a parameter termed 'Function' in the present disclosure which indicates its use for UL CSI acquisition (in contrast to DL CSI acquisition) can be used. This parameter can take two values such as 'DL CSI' or 'UL CSI'. When CSI-RS is configured as such (for UL CSI acquisition), TX (transmit) precoding applied to CSI-RS (by the gNB) should be the same as (or at least match) the RX (receive) precoding applied to gNB RX ports (for the purpose of receiving UL transmissions). Here, some type of QCL/correspondence between this SRS and a configured CSI-RS can be used. This correspondence can be a part of or in addition to the parameter 'Function'. Note that if the configured CSI-RS includes K>1 resources, the number of SRS resources can also include K>1 resources wherein each of the K CSI-RS resources corresponds to one of the K SRS resources. In this case, the correspondence includes K links. Optionally, the number of SRS resources $K' \geq 1$ is not necessarily equal to K. In this case, correspondence between $K' \geq 1$ SRS resources and K>1 CSI-RS resources also needs to be configured.

The embodiment in the previous paragraph can also apply to S>1 CSI-RS resource sets instead of K>1 CSI-RS resources. Or it can also apply to S'>1 SRS resource groups instead of K'>1 SRS resources.

In terms of CSI-RS resource configuration, at least the following mechanisms related to time-domain behavior are pertinent.

In a first mechanism, when P/SP-CSI-RS and P/SP-SRS are configured as such (four possible combinations: P-CSI-RS+P-SRS, P-CSI-RS+SP-SRS, SP-CSI-RS+P-SRS, and SP-CSI-RS+SP-SRS), the relationship between subframe-Configuration or slotConfiguration (which includes slot/subframe offset and periodicity) of these CSI-RS and SRS can be utilized. For example, the CSI-RS periodicity can be set equal to an integer multiple of SRS periodicity while CSI-RS slot/subframe offset can be defined relative to SRS slot/subframe offset.

When SP-CSI-RS and SP-SRS are configured, SP-CSI-RS can share the same activation/deactivation as SP-SRS. Sharing the same activation/deactivation refers to the use of one resource activation/deactivation message to activate or deactivate both SP-CSI-RS and SP-SRS. This message can be signaled to the UE via MAC CE (control element) or L1 DL control signaling (using either DL-related or UL-related DCI). When an activation message is received by the UE in slot/subframe n, the UE can assume that starting from slot/subframe n+D1 (where D1 can either be specified, or configured via higher-layer signaling, or signaled via L1 DL control signaling), the UE can measure CSI-RS with the configuration information (including resource index/indices, periodicity and slot/subframe offset) given in the Resource Setting with CSI-RS as well as transmit SRS with the configuration information (including resource index/indices, periodicity, and slot/subframe offset) given in the Resource Setting with SRS. Likewise, when a deactivation message is received by the UE in slot/subframe n, the UE can assume that starting from slot/subframe n+D2 (where D2 can either be specified, or configured via higher-layer signaling, or signaled via L1 DL control signaling), the UE can stop measuring CSI-RS with the configuration information (including resource index/indices, periodicity and slot/subframe offset) given in the Resource Setting with CSI-RS as well as stop transmitting SRS with the configuration information (including resource index/indices, periodicity, and slot/subframe offset) given in the Resource Setting with SRS. Since CSI-RS and SRS resource configurations are in general not the same, the activation/deactivation message can include two resource configuration fields—one for CSI-RS, the other for SRS.

If K'>1 resources are configured for SRS, the configuration field in the activation/deactivation message can also include N'-subset selection of K' resources ($1 \leq N' \leq K'$). Likewise, if K>1 resources are configured for CSI-RS, the configuration field in the activation/deactivation message can also include N-subset selection of K resources ($1 \leq N \leq K$). The values of N and N' can be configured via higher-layer signaling or via MAC CE (either explicitly or implicitly inferred from an activation message).

The embodiment in the previous paragraph can also apply to S>1 CSI-RS resource sets instead of K>1 CSI-RS resources. Or it can also apply to S'>1 SRS resource groups instead of K'>1 SRS resources.

This mechanism can be extended when the UE is configured with another SRS (either NZP or ZP) for UL interference measurement. In this case, the activation/release message also includes configuration information pertaining to the other SRS. Since this joint activation/deactivation mechanism is analogous to that for Component I, it can also be illustrated in FIG. 5.

The embodiment in the previous paragraph can apply to non-zero power (NZP) CSI-RS as well as zero-power (ZP) CSI-RS Likewise, it can apply non-zero power (NZP) SRS as well as zero-power (ZP) SRS.

In a second mechanism, when AP-CSI-RS and AP-SRS are configured as such, the same DCI is used to trigger AP-SRS transmission with the presence of AP-CSI-RS in the same slot/subframe. Therefore, in an embodiment, when the UE receives either an UL-related or DL-related DCI which includes CSI request field and the CSI request field in ON (implying a request for A-CSI reporting) in slot/subframe n, the UE will report A-CSI and transmit AP-SRS in slot/subframe n+D3 (where D3 can either be specified, or configured via higher-layer signaling, or signaled via L1 DL control signaling), the gNB/network receives both A-CSI reporting and AP-SRS transmission in the same slot/subframe.

As an optional feature of this mechanism, when the UE receives either an UL-related or DL-related DCI which includes a trigger/request for AP-SRS transmission, AP-CSI-RS transmission can be present in the same DL slot/subframe. This AP-SRS trigger can also be accompanied with a DCI field that carries some information on the AP-CSI-RS such as the selected CSI-RS resource or resource configuration. For this option, a plurality of K>1 CSI-RS resources for the purpose of AP-CSI-RS in this mechanism can be configured for a UE and the selected CSI-RS resource is chosen from the K configured resources. The selection is indicated and signaled via the DCI field.

Optionally, instead of having a separate DCI field, this CSI-RS information can be a part of the AP-SRS trigger.

Optionally, the configured CSI-RS resource for the purpose of AP-CSI-RS in this mechanism can be configured semi-statically via higher-layer signaling. For this option, only one CSI-RS resource for the purpose of AP-CSI-RS in this mechanism can be configured for a UE. Therefore, there is no indication needed to be signaled via DCI (L1 control signaling).

Optionally, a plurality of K>1 non-zero power (NZP) CSI-RS resources for the purpose of AP-CSI-RS in this mechanism can be configured for a UE and the selected CSI-RS resource (that is, state which represents a selection) is associated with AP-SRS triggering/request state. This association can be either configured semi-statically via higher-layer signaling (such as RRC) or dynamically (such as via MAC CE). For this option, there is no indication needed to be signaled via DCI (L1 control signaling) since the selection of CSI-RS resource for the purpose of AP-CSI-RS in this mechanism is implicitly tied (associated) with the AP-SRS triggering state or DCI field code point (such as the selection of SRS resource for the purpose of AP-SRS in this mechanism).

Optionally, when a UE is configured with a plurality of K>1 non-zero power (NZP) CSI-RS resources for the purpose of AP-CSI-RS in this mechanism and the UE is also configured with K'>1 SRS resources, the association between AP-SRS triggering state and NZP CSI-RS resource can also be determined based on a predefined association rule. For example, K can be set to be equal to K' and the k'-th SRS resource (=0, 1, ..., K'−1) can be associated with the k-th CSI-RS resource (k=0, 1, ..., K−1) where k=k'. In another example, K can be set to be less than or equal to K' and the k'-th SRS resource can be associated with the k-th CSI-RS resource where k=mod(k',K). In another example, K can be set to be equal to K'/M (where M is an integer, which can be predetermined/fixed or configured via higher-layer signaling) and the k'-th SRS resource can be associated with the k-th CSI-RS resource where k=mod (k', K)=mod(k',K'/M). In another example, K can be set to be equal to K'/M (where M is an integer, which can be predetermined/fixed or configured via higher-layer signaling) and the k'-th SRS resource can be associated with the k-th CSI-RS resource where k=⌊k'/M⌋.

When both AP-CSI-RS and AP-SRS are configured with multiple resources (K>1 resources are configured for CSI-RS and K'>1 resources are configured for SRS), analogous to that for Component I, AP-SRS can share the same activation as AP-CSI-RS. Sharing the same activation refers to the use of one resource activation message to perform both N-subset selection of K resources (1≤N≤K) for AP-CSI-RS and N'-subset selection of K' resources (1≤N'≤K') for AP-SRS. This message can be signaled to the UE via MAC CE (control element) or L1 DL control signaling (using either DL-related or UL-related DCI). When an activation message is received by the UE in slot/subframe n, the UE can assume that starting from slot/subframe n+D4 (where D1 can either be specified, or configured via higher-layer signaling, or signaled via L1 DL control signaling), the N-subset of AP-CSI-RS resources and the N'-subset selection of AP-SRS resources indicated in the resource selection information (in the activation message) are selected. Since CSI-RS and SRS resource configurations are in general not the same, the activation/deactivation message can include two resource configuration fields—one for CSI-RS, the other for SRS.

The embodiment in the previous paragraph can also apply to S>1 CSI-RS resource sets instead of K>1 CSI-RS resources. Or it can also apply to S'>1 SRS resource groups instead of K'>1 SRS resources.

The embodiment in the previous paragraph can apply to non-zero power (NZP) CSI-RS as well as zero-power (ZP) CSI-RS Likewise, it can apply non-zero power (NZP) SRS as well as zero-power (ZP) SRS.

Since this joint activation/deactivation mechanism is analogous to that for Component I, it can also be illustrated in FIG. 6.

When both AP-CSI-RS and AP-SRS are configured with multiple resources (K>1 resources are configured for CSI-RS and K'>1 resources are configured for SRS) and the AP-CSI-RS is configured for UL CSI acquisition (for instance, 'Function' is set to 'UL CSI'), the transmission of AP-CSI-RS can be performed as follows. In the slot/subframe which includes AP-CSI-RS, the A-CSI triggering is OFF (CSI request field is set to 0) since AP-CSI-RS is used for UL precoding calculation (by the UE due to DL-UL channel reciprocity), not for A-CSI reporting calculation. In relation to AP-SRS, at least the following options can be used.

In a first option (Opt1), the DCI (either UL- or DL-related) used to trigger AP-SRS transmission is accompanied with AP-CSI-RS transmission in a same DL slot/subframe. Therefore, the UE can assume that when AP-SRS is triggered (the SRS triggering field is set to 1 or ON), AP-CSI-RS configured for UL CSI acquisition is present in the same DL slot/subframe and can be measured by the UE.

As an optional feature of this mechanism, this AP-SRS trigger can also be accompanied with a DCI field that carries some information on the AP-CSI-RS such as the selected CSI-RS resource or resource configuration. For this option, a plurality of K>1 CSI-RS resources for the purpose of AP-CSI-RS in this mechanism can be configured for a UE and the selected CSI-RS resource is chosen from the K configured resources. The selection is indicated and signaled via the DCI field.

Optionally, instead of having a separate DCI field, this CSI-RS information can be a part of the AP-SRS trigger.

Optionally, the configured CSI-RS resource for the purpose of AP-CSI-RS in this mechanism can be configured semi-statically via higher-layer signaling. For this option, only one CSI-RS resource for the purpose of AP-CSI-RS in this mechanism can be configured for a UE. Therefore, there is no indication needed to be signaled via DCI (L1 control signaling).

Optionally, a plurality of K>1 CSI-RS resources for the purpose of AP-CSI-RS in this mechanism can be configured for a UE and the selected CSI-RS resource (that is, state which represents a selection) is associated with AP-SRS triggering/request state. This association can be either configured semi-statically via higher-layer signaling (such as RRC) or dynamically (such as via MAC CE). For this option, there is no indication needed to be signaled via DCI (L1 control signaling) since the selection of CSI-RS resource for the purpose of AP-CSI-RS in this mechanism is implicitly tied (associated) with the AP-SRS triggering state or DCI field code point (such as the selection of SRS resource for the purpose of AP-SRS in this mechanism).

Optionally, when a UE is configured with a plurality of K>1 non-zero power (NZP) CSI-RS resources for the purpose of AP-CSI-RS in this mechanism and the UE is also configured with K'>1 SRS resources, the association between AP-SRS triggering state and NZP CSI-RS resource can also be determined based on a predefined association rule. For example, K can be set to be equal to K' and the k'-th SRS resource (=0, 1, . . . , K'−1) can be associated with the k-th CSI-RS resource (k=0, 1, . . . , K−1) where k=k'. In another example, K can be set to be less than or equal to K' and the k'-th SRS resource can be associated with the k-th CSI-RS resource where k=mod (k', K). In another example, K can be set to be equal to K'/M (where M is an integer, which can be predetermined/fixed or configured via higher-layer signaling) and the k'-th SRS resource can be associated with the k-th CSI-RS resource where k=mod (k', K)=mod(k', K'/M). In another example, K can be set to be equal to K'/M (where M is an integer, which can be predetermined/fixed or configured via higher-layer signaling) and the k'-th SRS resource can be associated with the k-th CSI-RS resource where k=⌊k'/M⌋.

In this case, AP-CSI-RS received by the UE is earlier than the triggered AP-SRS received by gNB. Therefore, the delay between the received AP-CSI-RS and the received UL grant (which includes UL precoding information such as transmit PMI and transmit RI) can be large.

The embodiment in the previous paragraph can also apply to S>1 CSI-RS resource sets instead of K>1 CSI-RS resources. Or it can also apply to S'>1 SRS resource groups instead of K'>1 SRS resources.

The embodiment in the previous paragraph can apply to non-zero power (NZP) CSI-RS as well as zero-power (ZP) CSI-RS Likewise, it can apply non-zero power (NZP) SRS as well as zero-power (ZP) SRS.

Diagram 800 of FIG. 8 illustrates an example operation according to Opt1 wherein the gNB triggers AP-SRS from UE-k via a DCI and, in a same slot/subframe, transmits AP-CSI-RS configured for the purpose of UL CSI acquisition (810). As UE-k receives the DCI, it measures AP-CSI-RS (820), then reports A-CSI and transmits AP-SRS in a later slot/subframe (830). Using the triggered AP-SRS, the gNB performs link adaptation and scheduling and sends an UL grant to UE-k which includes TPMI and TRI in the UL-related DCI (840). Then UE-k receives the UL grant (850) and uses the signaled TPMI and TRI together with the AP-CSI-RS (which was received and measured early on) to derive the UL precoder used for the granted UL transmission on PUSCH (860). In this case, a significant lag between the reception of AP-CSI-RS and TPMI takes place.

In a second option (Opt2), the UL-related DCI used for UL grant with transmit PMI and RI field is accompanied with AP-CSI-RS in a same DL slot/subframe. Therefore, there is no linkage between AP-SRS triggering and AP-CSI-RS reception. That is, AP-SRS can be triggered separately. In this case, the AP-CSI-RS received by the UE can be measured by the UE to refine the UL precoding information indicated in the transmit PMI (TPMI) in the same DL slot/subframe. Thus, there is no lag between the received TPMI and the received AP-CSI-RS.

In a variation of this Opt2, TPMI field can indicate precoder or precoder set/group. In another variation, TPMI can be absent (hence only transmit RI is included in the UL-related DCI). In another variation, when the DCI (UL- or DL-related) used to trigger AP-SRS is received in slot/subframe n (hence AP-SRS is transmitted in subframe n+D), the UL-related DCI for Opt2 is received in subframe n+D+D' (where D and/or D' can be specified/fixed or configured). Here, the gNB/network can choose or control the value of D' such that the lag between AP-SRS reception at the gNB/network and AP-CSI-RS transmission is sufficiently small.

Figure 9:
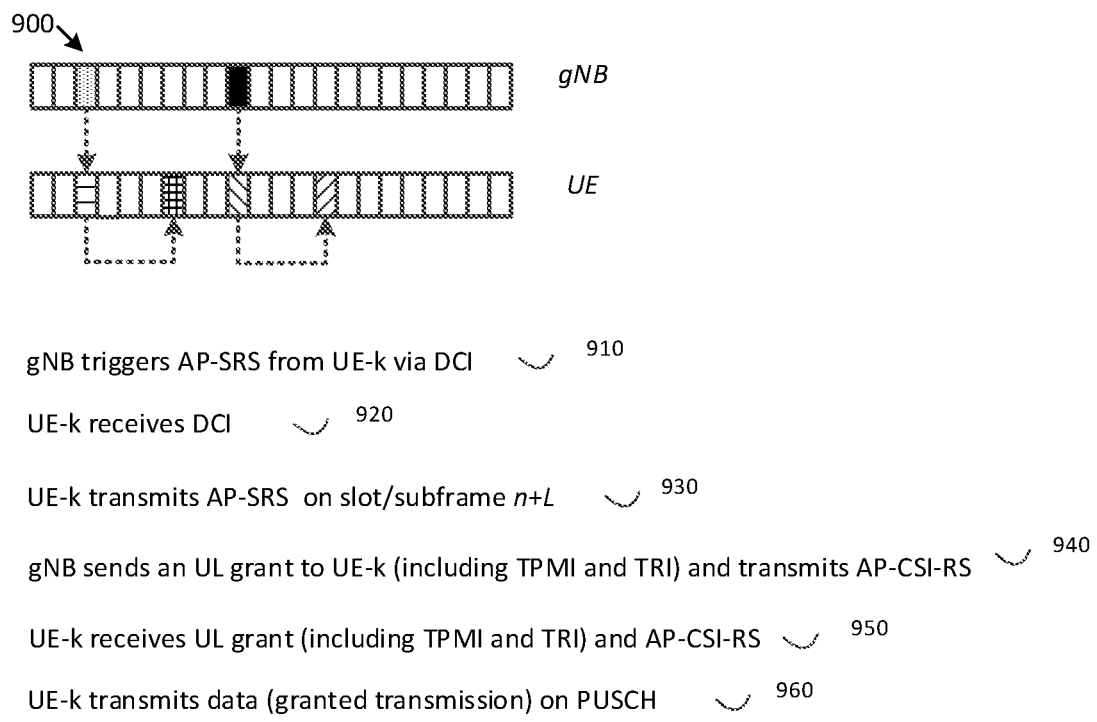
FIG. 9 illustrates an example embodiment of AP-SRS triggering according to an embodiment of the present disclosure.

Diagram 900 of FIG. 9 illustrates an example operation according to Opt2 wherein the gNB triggers AP-SRS from UE-k (910) via a DCI (either DL- or UL-related). As UE-k receives the DCI (920) and transmits the AP-SRS (930), the gNB measures the AP-SRS and utilizes it for UL CSI acquisition (associated with UE-k). The gNB then sends an UL grant to UE-k (940) which includes TPMI and TRI in the UL-related DCI. In the same DL slot/subframe, AP-CSI-RS configured for UL CSI acquisition is transmitted. As UE-k receives the UL grant and measures the transmitted AP-CSI-RS (950), the UE calculates the UL precoder from the received TPMI and TRI in conjunction with the AP-CSI-RS for transmitting the granted UL transmission on PUSCH (960). Evidently, there is no lag between AP-CSI-RS and TPMI. As described above, the lag between 930 and 940 can be left to gNB scheduler implementation if there is no linkage between the A-SRS triggering and the AP-CSI-RS transmission/allocation. Essentially this depends on how fast the gNB can measure AP-SRS and schedule an UL grant for UE-k.

Any of the above variation embodiments can be utilized independently or in combination with at least one other variation embodiment.

Figure 10:
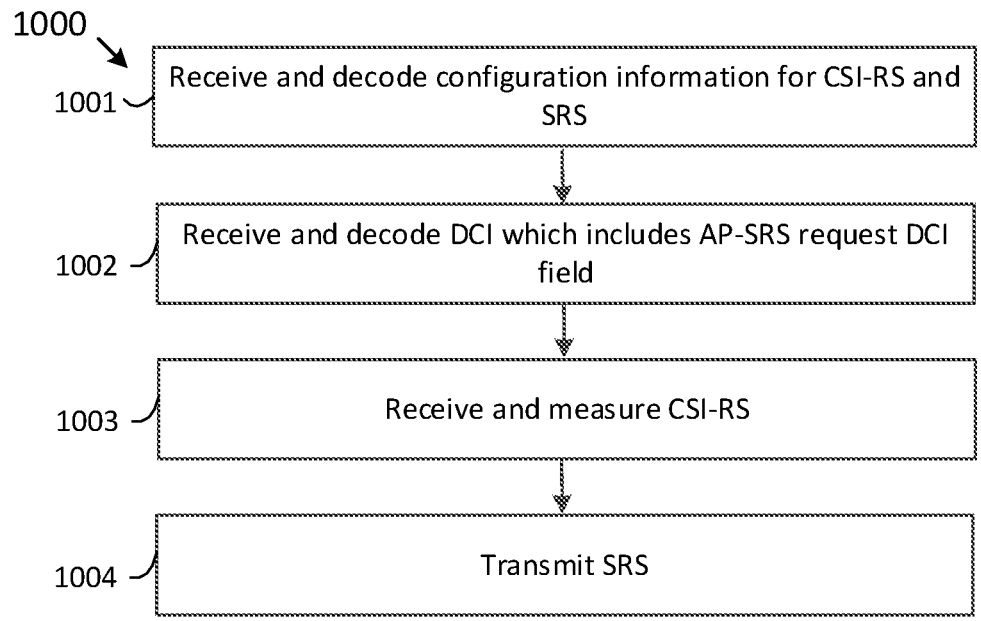
FIG. 10 illustrates a flowchart for an example method wherein a UE receives configuration information for CSI-RS and SRS according to an embodiment of the present disclosure.

FIG. 10 illustrates a flowchart for an example method 1000 wherein a UE receives and decodes configuration information for channel state information reference signal (CSI-RS) and sounding reference signal (SRS) according to an embodiment of the present disclosure. For example, the method 1000 can be performed by the UE 116.

The method 1000 begins with the UE receiving and decoding configuration information for channel state information reference signal (CSI-RS) and sounding reference signal (SRS) (step 1001). In addition, the UE receives and decodes downlink control information (DCI) which includes a DCI field for requesting aperiodic SRS transmission (step 1002). The SRS corresponds to a higher-layer configured SRS resource and the number of configured SRS resources is more than one. After the UE decodes the DCI, the UE can proceed by receiving and measuring the CSI-RS (step 1003)

wherein the CSI-RS is received in a same downlink slot as the DCI. The CSI-RS corresponds to a higher-layer configured non-zero-power (NZP) CSI-RS resource. The DCI field comprises aperiodic SRS triggering states associated with the configured SRS resources. The configured NZP CSI-RS resource is measured to calculate the precoder used for the SRS, which is later transmitted (step 1004). The number of configured NZP CSI-RS resources can be one. Optionally, the number of configured NZP CSI-RS resources is more than one and the association between the SRS triggering states and the configured SRS resources also includes an association with the configured NZP CSI-RS resources.

Figure 11:
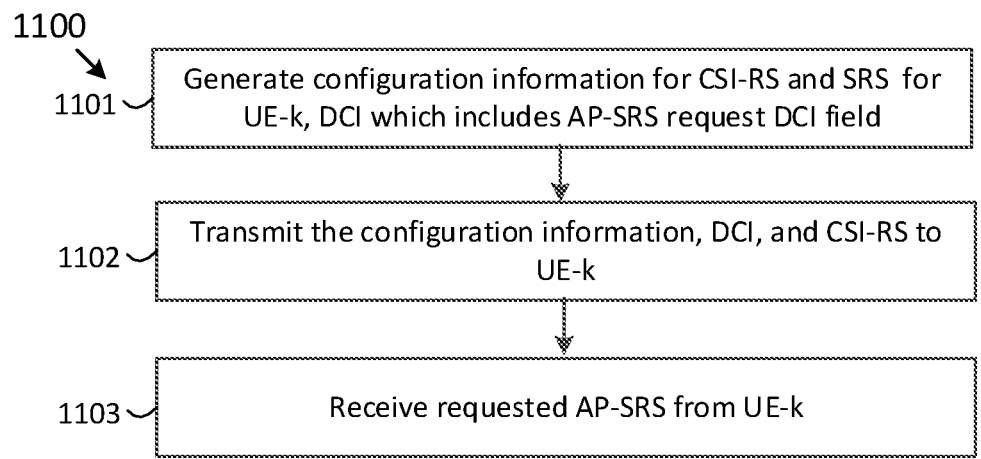
FIG. 11 illustrates a flowchart for an example method wherein a BS generates configuration information for CSI-RS and SRS for a UE (labeled as UE-k) according to an embodiment of the present disclosure.

FIG. 11 illustrates a flowchart for an example method 1100 wherein a BS generates configuration information for channel state information reference signal (CSI-RS) and sounding reference signal (SRS) for a UE (labeled as UE-k) according to an embodiment of the present disclosure. For example, the method 1100 can be performed by the BS 102.

The method 1100 begins with the BS generating configuration information for channel state information reference signal (CSI-RS) and sounding reference signal (SRS) for a UE (termed UE-k) as well as downlink control information (DCI) which includes a DCI field for requesting aperiodic SRS transmission (step 1101). The BS then proceeds with transmitting the configuration information, the DCI via a downlink (DL) channel, and the CSI-RS to UE-k (step 1102). The CSI-RS is transmitted in a same downlink slot as the DCI and corresponds to a higher-layer configured non-zero-power (NZP) CSI-RS resource. The SRS corresponds to a higher-layer configured SRS resource and the number of configured SRS resources is more than one. The DCI field comprises aperiodic SRS triggering states associated with the configured SRS resources. The NZP CSI-RS resource is measured to calculate the precoder used for the transmitted SRS. The number of configured NZP CSI-RS resources can be one. Optionally, the number of configured NZP CSI-RS resources is more than one and the association between the SRS triggering states and the configured SRS resources also includes an association with the configured NZP CSI-RS resources. The BS proceeds with receiving the requested aperiodic SRS from UE-k (step 1103).

Although FIGS. 10 and 11 illustrate examples of methods for receiving configuration information and configuring a UE, respectively, various changes could be made to FIGS. 10 and 11. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE), comprising:
a transceiver configured to receive (i) configuration information for configuring a channel state information reference signal (CSI-RS) and indicating a plurality of higher-layer configured sounding reference signal (SRS) resources, and (ii) downlink control information (DCI) that includes a DCI field for an aperiodic SRS transmission request; and
a processor operably connected to the transceiver, the processor configured to decode the configuration information and the DCI with the aperiodic SRS transmission request,
wherein the transceiver is further configured to receive the CSI-RS and transmit the SRS,
wherein the CSI-RS corresponds to at least one higher-layer configured non-zero-power (NZP) CSI-RS resource,
wherein the NZP CSI-RS resource is measured to calculate a precoder used for the transmitted SRS, and
wherein the DCI field is also used to indicate presence of the CSI-RS in a same DL slot as the DCI.

2. The UE of claim 1, wherein the DCI field comprises aperiodic SRS triggering states associated with the configured SRS resources.

3. The UE of claim 2, wherein a number of configured NZP CSI-RS resources is one.

4. The UE of claim 2, wherein a number of configured NZP CSI-RS resources is more than one and an association between the aperiodic SRS triggering states and the configured SRS resources also includes an association with the configured NZP CSI-RS resources.

5. A base station (BS), comprising:
a processor configured to generate (i) configuration information for configuring a channel state information reference signal (CSI-RS) and indicating a plurality of higher-layer configured sounding reference signal (SRS) resources, and (ii) downlink control information (DCI) that includes a DCI field for requesting transmission of an aperiodic SRS; and
a transceiver operably connected to the processor, the transceiver configured to:
transmit, to a UE, the configuration information and the DCI via a downlink (DL) channel and the CSI-RS, and
receive, from the UE, the requested aperiodic SRS,
wherein the CSI-RS corresponds to at least one higher-layer configured non-zero-power (NZP) CSI-RS resource,
wherein the NZP CSI-RS resource is measured to calculate a precoder used for the received SRS, and
wherein the DCI field is also used to indicate presented of the CSI-RS in a same DL slot as the DCI.

6. The BS of claim 5, wherein the DCI field comprises aperiodic SRS triggering states associated with the configured SRS resources.

7. The BS of claim 6, wherein an association between the aperiodic SRS triggering states and the configured SRS resources also includes an association with the configured NZP CSI-RS resources.

8. A method for operating a user equipment (UE), the method comprising:
receiving and decoding (i) configuration information for configuring a channel state information reference signal (CSI-RS) and indicating a plurality of higher-layer configured sounding reference signal (SRS) resources blocks in which the SRS is transmitted, and (ii) downlink control information (DCI) that includes a DCI field for requesting an aperiodic SRS transmission; and
receiving the CSI-RS and transmitting the SRS,
wherein the CSI-RS corresponds to at least one higher-layer configured non-zero-power (NZP) CSI-RS resource,
wherein the NZP CSI-RS resource is measured to calculate a precoder used for the transmitted SRS, and
wherein the DCI field is also used to indicate presence of the CSI-RS in a same DL slot as the DCI.

9. The method of claim 8, wherein the DCI field comprises aperiodic SRS triggering states associated with the configured SRS resources.

10. The method of claim 9, wherein a number of configured NZP CSI-RS resources is one.

11. The method of claim 9, wherein a number of configured NZP CSI-RS resources is more than one and an association between the aperiodic SRS triggering states and the configured SRS resources also includes an association with the configured NZP CSI-RS resources.

* * * * *